(12) United States Patent
Ito

(10) Patent No.: US 10,084,677 B2
(45) Date of Patent: Sep. 25, 2018

(54) NETWORK DEVICE, CONTROL METHOD, AND STORAGE MEDIUM

(71) Applicant: CANON KABUSHIKI KAISHA, Tokyo (JP)

(72) Inventor: Yuki Ito, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 14/936,941

(22) Filed: Nov. 10, 2015

(65) Prior Publication Data

US 2016/0142277 A1 May 19, 2016

(30) Foreign Application Priority Data

Nov. 17, 2014 (JP) ................... 2014-232797

(51) Int. Cl.
  *G06F 15/173* (2006.01)
  *H04L 12/26* (2006.01)
  *H04L 12/64* (2006.01)

(52) U.S. Cl.
  CPC .......... *H04L 43/10* (2013.01); *H04L 12/6418* (2013.01); *H04L 43/00* (2013.01); *H04L 43/50* (2013.01)

(58) Field of Classification Search
  CPC ..... H04L 43/10; H04L 12/6418; H04L 43/00; H04L 43/50
  USPC ....................................................... 709/224
  See application file for complete search history.

(56) References Cited

U.S. PATENT DOCUMENTS

| 6,434,601 B1* | 8/2002 | Rollins | H04L 51/28 709/206 |
| 2002/0120699 A1* | 8/2002 | Wakabayashi | H04L 51/30 709/206 |
| 2004/0088395 A1* | 5/2004 | O'Konski | H04L 41/5012 709/223 |
| 2006/0033947 A1* | 2/2006 | Kadota | G06F 3/1222 358/1.14 |
| 2008/0052342 A1* | 2/2008 | Koga | H04N 1/00347 709/201 |

(Continued)

FOREIGN PATENT DOCUMENTS

JP  2004086729 A  3/2004

*Primary Examiner* — James E Springer
(74) *Attorney, Agent, or Firm* — Rossi, Kimms & McDowell LLP

(57) ABSTRACT

The present invention relates to a network device that is connected to a network and able to perform communication with a monitoring server via the network, a control method of a network device, and a storage medium that stores a program of implementing the control method. A network device according to the present embodiment generates first transmission data including setting information of the network device and generates second transmission data in the same structure as the first transmission data with lower processing load than the first transmission data. The network device transmits the generated second transmission data to the monitoring server using a command for executing a process different from a communication acknowledgement process. The network device suppresses transmission of the first transmission data in a case where a predetermined response to transmission of the second transmission data from the monitoring server is not received.

14 Claims, 14 Drawing Sheets

(56) References Cited

U.S. PATENT DOCUMENTS

| | | | |
|---|---|---|---|
| 2008/0074708 A1* | 3/2008 | Mallya | H04N 1/00127 358/405 |
| 2013/0173784 A1* | 7/2013 | Wang | H04L 43/026 709/224 |
| 2013/0227358 A1* | 8/2013 | Yokokura | G06F 11/0733 714/57 |

* cited by examiner

| 231 | 232 | 233 | 234 |
|---|---|---|---|
| TIER-1 | TIER-2 | TIER-3 | VALUE |
| COPY | ADJUSTMENT | BRIGHTNESS | 90 |
| PRINTER | ADJUSTMENT | SHARPNESS | 45 |
| SCANNER | ADJUSTMENT | SHARPNESS | 60 |
| ... | ... | ... | ... |

```
<env:Envelope
xmlns:env="http://schemas.xmlsoap.org/soap/envelope/"
env:encodingStyle="http://schemas.xmlsoap.org/soap/encoding/">
 <env:Body>
  <ns:getClock xmlns:ns="rdsgw">
  </ns:getClock>
 </env:Body>
</env:Envelope>
```

502

```
<SOAP-ENV:Envelope xmlns:SOAPENV="
http://schemas.xmlsoap.org/soap/envelope/"
xmlns:xsi="http://www.w3.org/2001/XMLSchema-instance"
xmlns:xsd="http://www.w3.org/2001/XMLSchema">
 <SOAP-ENV:Body>
  <ns:getClockResponse xmlns:ns1="rdsgw" SOAP-
ENV:encodingStyle="http://schemas.xmlsoap.org/soap/encoding/">
   <datetime>2014-06-01T10:20:30.444Z</datetime>
  </ns:getClockResponse>
 </SOAP-ENV:Body>
</SOAP-ENV:Envelope>
```

503

```
<env:Envelope
xmlns:env="http://schemas.xmlsoap.org/soap/envelope/"
env:encodingStyle="http://schemas.xmlsoap.org/soap/encoding/">
 <env:Body>
  <ns:postServiceMode xmlns:ns="rdsgw">
   <client>
    <id>100</id>
    <type>type A</type>
    <appVersion>1.00</appVersion>
   </client>
   <serviceModeMenu>
    <position>COPY.ADJUSTMENT.BRIGHTNESS</position>
    <value>90</value>
   </serviceModeMenu>
   <serviceModeMenu>
    <position>PRINTER.ADJUSTMENT.SHARPNESS</position>
    <value>45</value>
   </serviceModeMenu>
   <serviceModeMenu>
    <position>SCANNER.ADJUSTMENT.SHARPNESS</position>
    <value>60</value>

</serviceModeMenu>
  </ns:postServiceMode>
 </env:Body>
</env:Envelope>
```

504

```
<SOAP-ENV:Envelope xmlns:SOAPENV="
http://schemas.xmlsoap.org/soap/envelope/"
xmlns:xsi="http://www.w3.org/2001/XMLSchema-instance"
xmlns:xsd="http://www.w3.org/2001/XMLSchema">
 <SOAP-ENV:Body>
  <ns:postServiceModeResponse xmlns:ns1="rdsgw" SOAP-
ENV:encodingStyle="http://schemas.xmlsoap.org/soap/encoding/">
   <result>0</result>
  </ns:postServiceModeResponse>
 </SOAP-ENV:Body>
</SOAP-ENV:Envelope>
```

FIG.5

```
<env:Envelope
  xmlns:env="http://schemas.xmlsoap.org/soap/envelope/"
  env:encodingStyle="http://schemas.xmlsoap.org/soap/encoding/">
  <env:Body>
    <ns:checkHost xmlns:ns="rdsgw">
      <HostUrl>http://host.net/host/agent</HostUrl>
    </ns:checkHost>
  </env:Body>
</env:Envelope>
```

901

```
<SOAP-ENV:Envelope xmlns:SOAP-
ENV="http://schemas.xmlsoap.org/soap/envelope/"
xmlns:xsi="http://www.w3.org/2001/XMLSchema-instance"
xmlns:xsd="http://www.w3.org/2001/XMLSchema">
  <SOAP-ENV:Body>
    <ns:checkHostResponse xmlns:ns1="rdsgw" SOAP-
ENV:encodingStyle="http://schemas.xmlsoap.org/soap/encoding/">
      <result>0</result>
    </ns:checkHostResponse>
  </SOAP-ENV:Body>
</SOAP-ENV:Envelope>
```

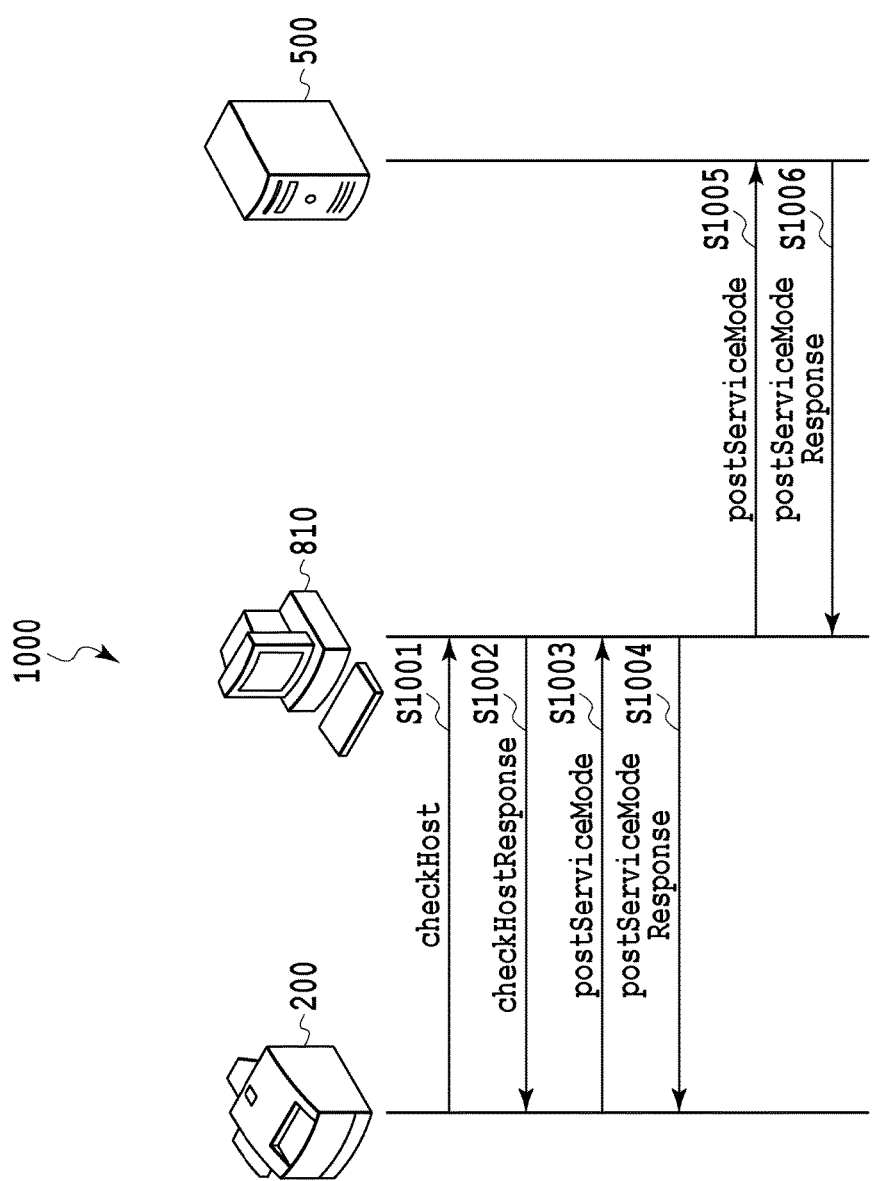

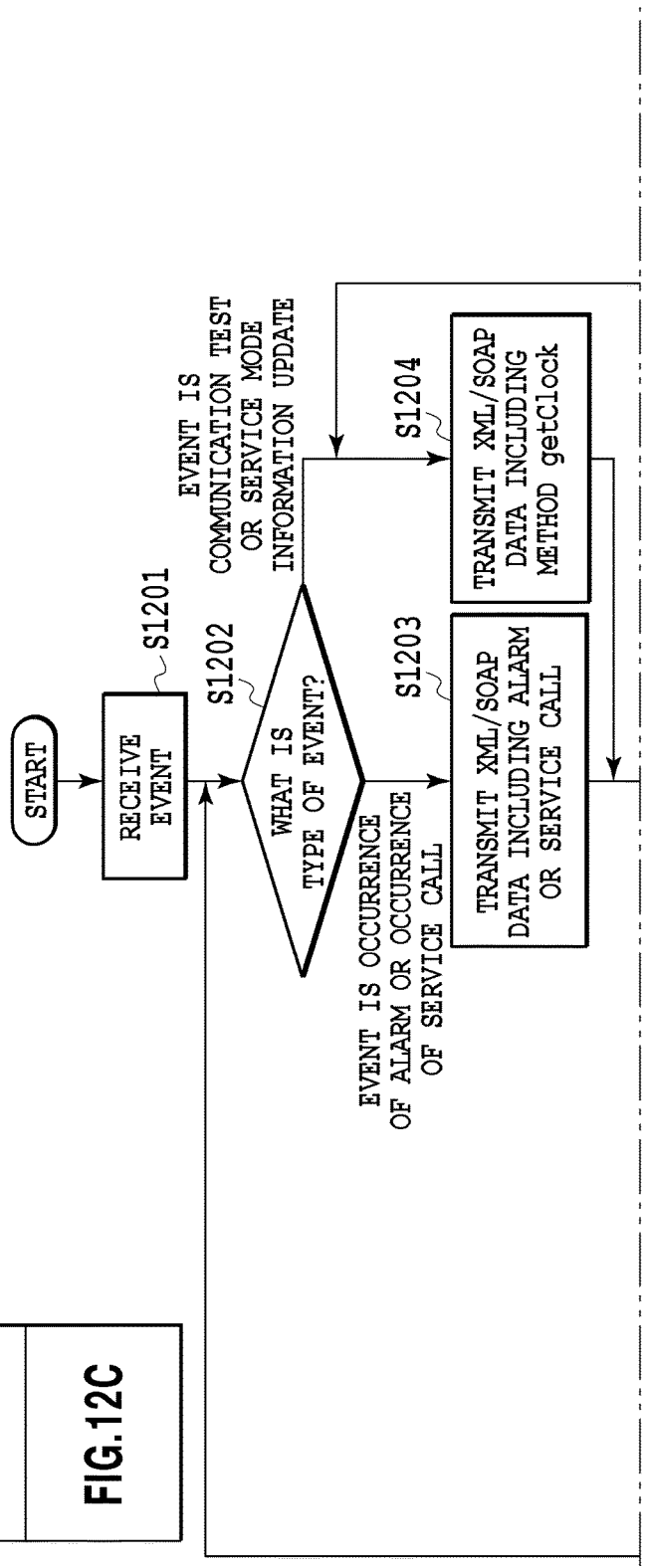

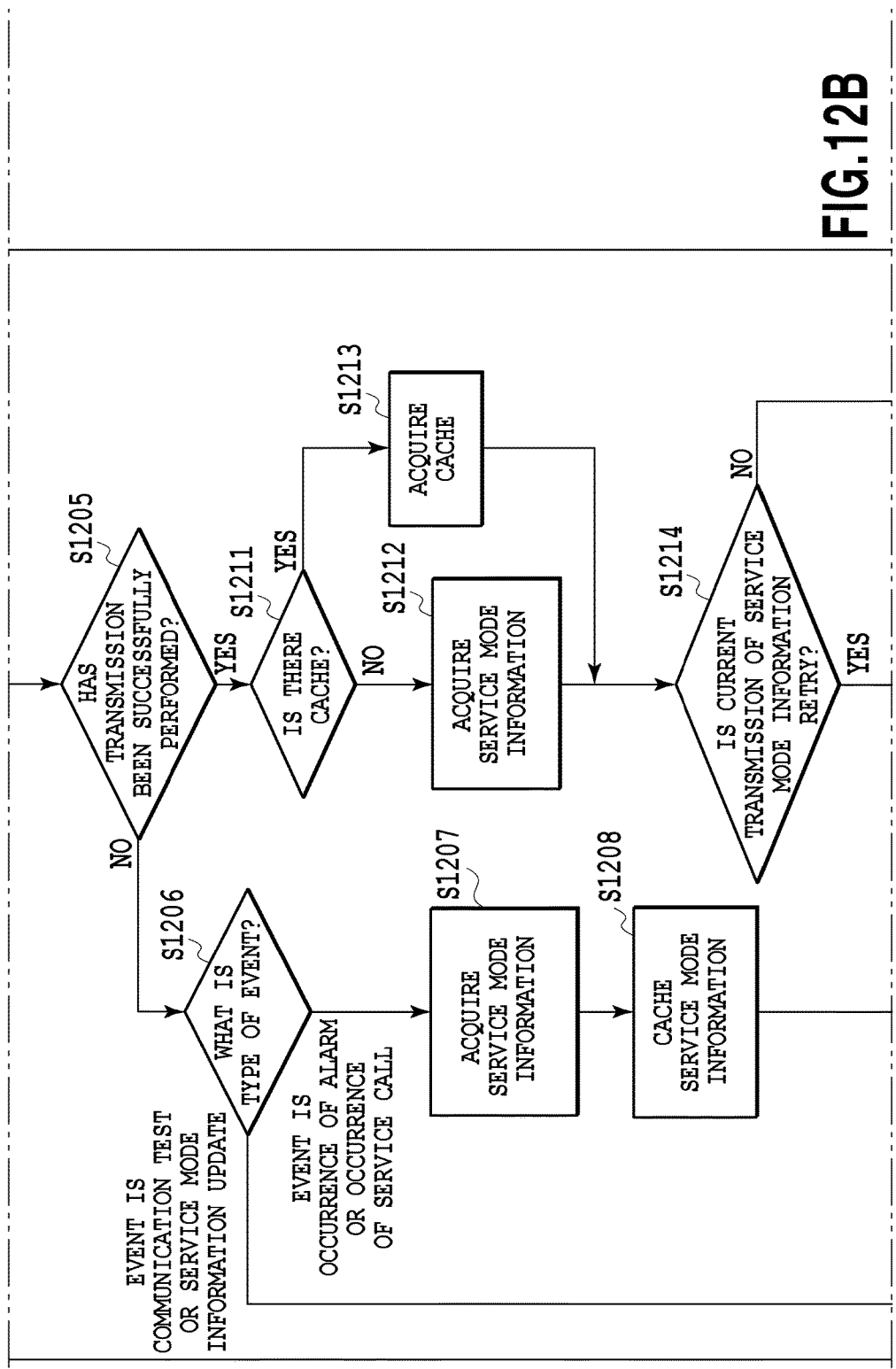

NETWORK DEVICE, CONTROL METHOD, AND STORAGE MEDIUM

BACKGROUND OF THE INVENTION

Field of the Invention

The present invention relates to a network device that is connected to a network and able to perform communication with a monitoring server via the network, a control method of a network device, and a storage medium that stores a program of implementing the control method.

Description of the Related Art

Recently, a system in which a monitoring server is connected with a network device via a network so that communication can be performed therebetween, and the monitoring server performs remote monitoring based on device information acquired from the network device is known.

In the system in which the remote monitoring for the network device is performed, the monitoring server acquires various information from the device. For example, the network device is provided with not only a user mode in which a user can perform an operation but also a service mode in which only a serviceman undertaking the maintenance of the device can perform an operation. In the service mode, service mode information indicating a state or a setting of the network device is acquired by the network device itself. Further, in a case where a trigger event occurs, the network device transmits the acquired service mode information to the monitoring server via the network.

In this remote monitoring system, in a case where a failure occurs in the monitoring server and thus the monitoring server is not able to communicate with the network device, it is wasteful for the network device to acquire of its service mode information. Further, under the situation in which communication between the monitoring server and the network device is disabled, if the network device transmits the service mode information, an unnecessary communication load is put on the network.

In a system disclosed in Japanese Patent Laid-Open No. 2004-086729, before a device transmits a packet to be transmitted to a destination, the device transmits a ping packet to the destination as a communication acknowledgement request, and a communication acknowledgement is performed between the device and the destination in advance.

SUMMARY OF THE INVENTION

However, in a case where the monitoring server is a HTTP server or the like and does not support reception of the ping packet, the monitoring server is not able to receive the communication acknowledgement request from the network device.

Thus, there are cases in which the network device is not able to perform a communication acknowledgement with the monitoring server by using the ping packet, and the wasteful process of acquiring the service mode information is consequently performed in the network device. Alternatively, there are cases in which since the network device transmits the service mode information without transmitting the communication acknowledgement request to the monitoring server, in a case where a failure occurs in the monitoring server, an unnecessary communication load is put on the network.

A network device of the present invention is a network device that generates first transmission data including setting information of the network device and transmits the generated first transmission data to a monitoring server via a network in a case where a predetermined event occurs, the network device comprising: a receiving unit configured to receive the predetermined event; a transmission data generating unit configured to generate second transmission data before the first transmission data is transmitted to the monitoring server in response to receiving the event, the second transmission data being generated in the same data structure as the first transmission data with a lower processing load than the first transmission data; a transmitting unit configured to transmit the generated second transmission data to the monitoring server using a command for executing a process different from a communication acknowledgement process; and a control unit configured to suppress the transmitting unit from transmitting the first transmission data in a case where a predetermined response to transmission of the second transmission data from the monitoring server is not received.

Further features of the present invention will become apparent from the following description of exemplary embodiments (with reference to the attached drawings).

BRIEF DESCRIPTION OF THE DRAWINGS

FIG. 4 is a diagram illustrating exemplary service mode information according to an embodiment;

FIG. 5 is a diagram illustrating exemplary transmission data according to an embodiment;

FIG. 9 is a diagram illustrating exemplary transmission data according to the second embodiment;

FIG. 10 is a diagram illustrating a communication sequence in the monitoring system according to the second embodiment;

FIG. 12 is a diagram showing the relationship of FIGS. 12A, 12B and 12C; and

FIGS. 12A, 12B and 12C are flowcharts illustrating a service mode information transmission process according to a third embodiment.

DESCRIPTION OF THE EMBODIMENTS

First Embodiment

Hereinafter, exemplary embodiments for carrying out the present invention will be described with reference to the appended drawings. Here, components described in the embodiments are merely examples and not intended to limit the scope of the present invention thereto.

Figure 1:
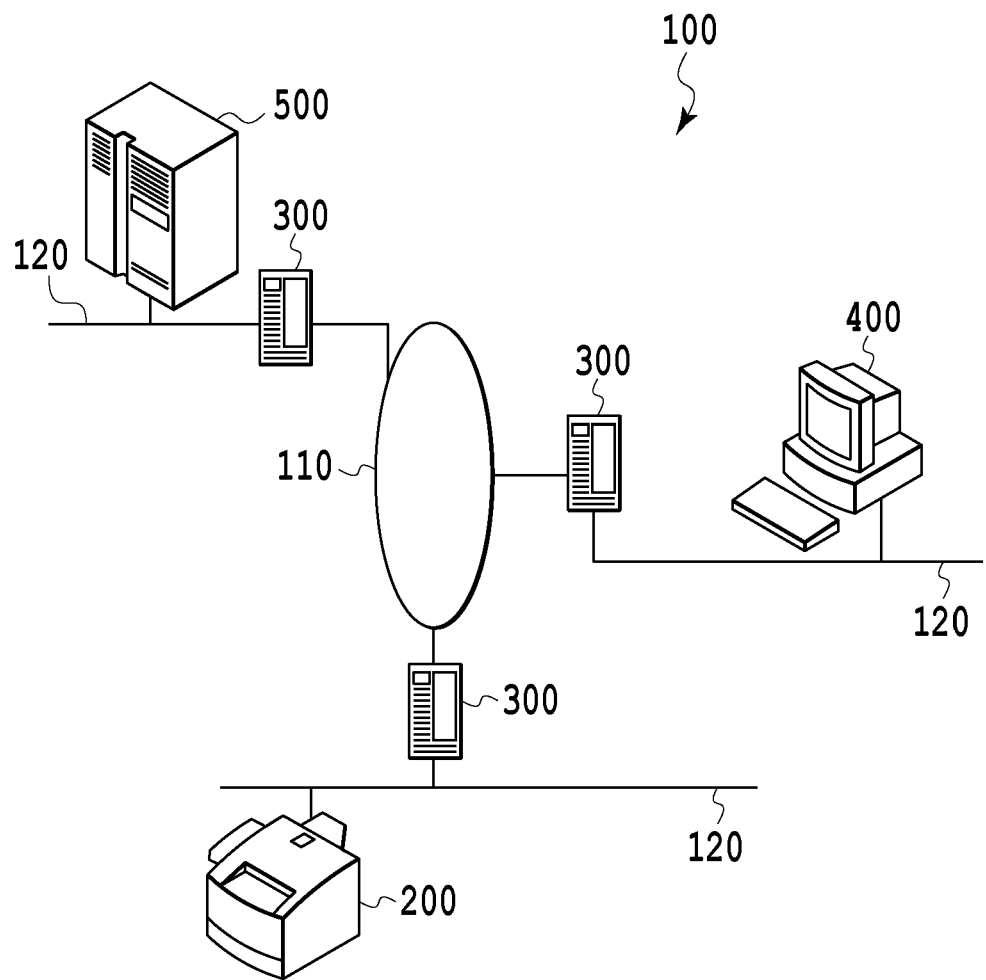
FIG. 1 is a diagram illustrating an overall configuration of a monitoring system according to an embodiment.

FIG. 1 is a diagram illustrating an overall configuration of a monitoring system 100 according to the present embodiment.

The monitoring system 100 includes a device 200, a proxy server 300, a personal computer (PC) 400, and a monitoring server 500, which are connected to one another so that communication can be performed via networks. The device 200 configures the network device. The device 200, the PC 400, and the monitoring server 500 are connected to one another so that communication can be performed via the proxy server 300 and the Internet 110. The device 200, the PC 400, and the monitoring server 500 are connected to one another so that communication can be performed via the proxy server 300 and a local area network (LAN) 120.

In a case where a predetermined event occurs, the device 200 transmits service mode information indicating a setting of the device 200 to the monitoring server 500. The monitoring server 500 monitors the device 200 based on the service mode information received from the device 200. The PC 400 can access the monitoring server 500 through a web browser and users can browse, for example, monitoring information for the device 200 stored in the monitoring server 500.

In the present embodiment, a system configuration including the Internet 110 is illustrated, but the system configuration may include only the LAN 120. Further, in the present embodiment, the system configuration including the proxy server 300 is illustrated, but the system configuration may not include the proxy server 300. Moreover, the number of devices 200 and the number of PCs 400 connected to the network to perform communication are not limited to ones described the present embodiment.

The present embodiment is described in connection with an example in which the network device is an image forming apparatus having a print function and a scanner function, but the network device according to the present invention can be applied to a device other than the image forming apparatus. Specifically, the network device according to the present invention can be applied to a network camera, a digital medical device, a three-dimensional (3D) printer, or the like. Further, a home appliance (for example, a television or air conditioning equipment) or an in-vehicle device (for example, a car navigation device) which is connected to a network can be also the network device to which the present invention can be applied.

Figure 2:
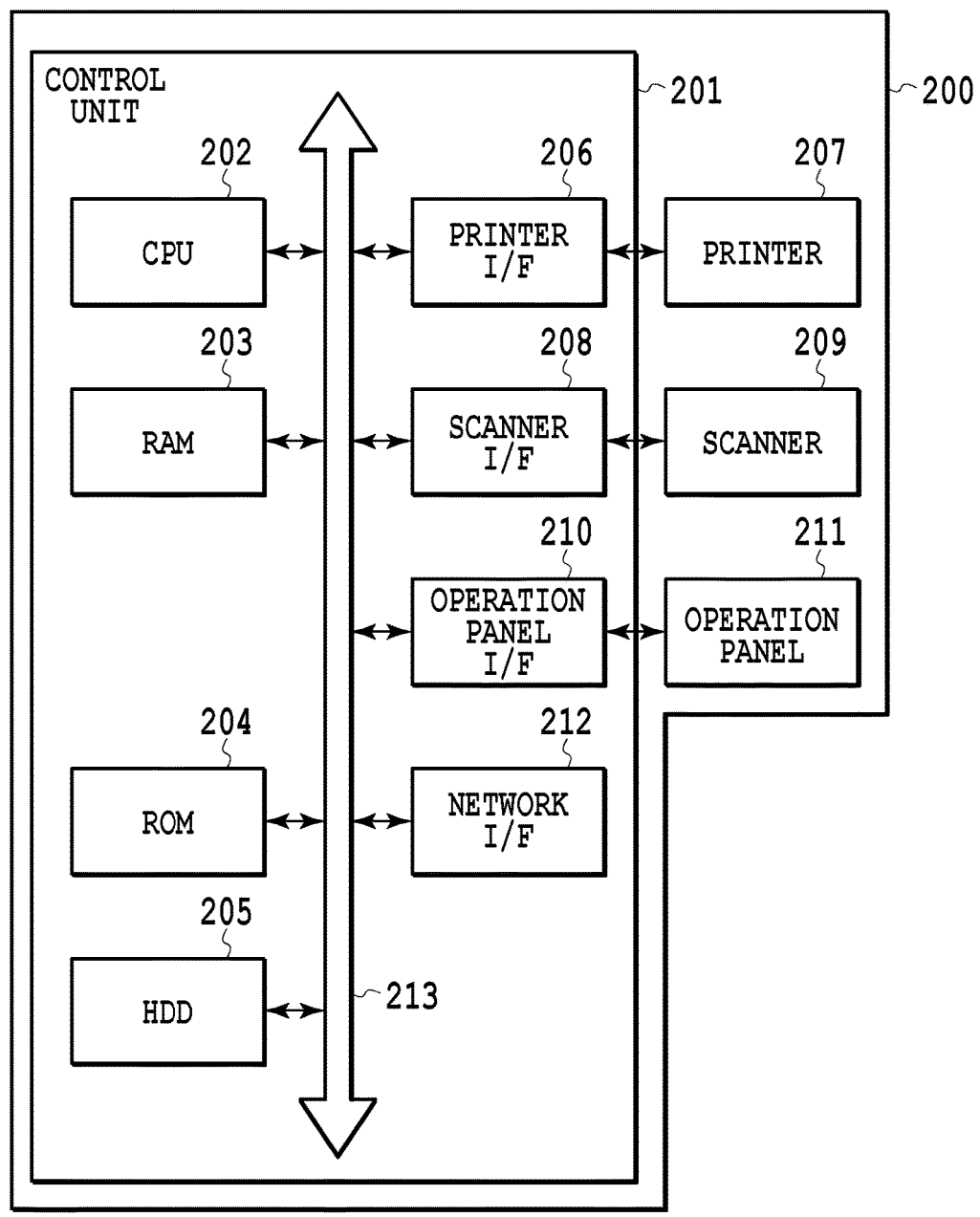
FIG. 2 is a block diagram illustrating a hardware configuration of a device according to an embodiment.

FIG. 2 is a block diagram illustrating a hardware configuration of the device 200 according to the present embodiment.

A control unit 201 includes a central processing unit (CPU) 202, and controls an operation of the device 200 in general. The CPU 202 reads a control program stored in a read only memory (ROM) 204, and performs various kinds of control such as communication control. A random access memory (RAM) 203 is used as a main memory of the CPU 202 or a temporary storage area such as a work area. A hard disk drive (HDD) 205 is used as an auxiliary storage area for storing data, various kinds of programs, or various kinds of information.

A printer interface (hereinafter, abbreviated as "I/F") 206 connects a printer 207 with the CPU 202 via a bus 213 so that communication can be performed therebetween. The printer 207 performs a print process on, for example, a print sheet fed from a paper cassette (not illustrated) based on print data input through the printer I/F 206. In the present embodiment, all types of printers such as an inkjet printer or an electrophotography printer can be applied as the printer 207.

A scanner I/F 208 connects a scanner 209 with the CPU 202 via the bus 213 so that communication can be performed therebetween. The scanner 209 scans a document placed on a scanning device (not illustrated) installed in the device 200, and generates image data. The image data generated by the scanner 209 can be printed through the printer 207 according to control of the CPU 202. Alternatively, the image data may be stored in the HDD 205 and transmitted to various kinds of external devices connected to the device 200 via a network I/F 212.

An operation panel I/F 210 connects an operation panel 211 with the CPU 202 via the bus 213 so that communication can be performed therebetween.

The network I/F 212 provides an interface for connecting the device 200 with various kinds of external devices so that communication can be performed therebetween. A LAN cable (not illustrated) is connected to the network I/F 212 so that communication with the external device is performed. The device 200 can receive print data from the external device via the network I/F 212, and the printer 207 can perform the print process based on the received print data. Alternatively, the image data generated by the scanner 209 can be transmitted to the external device via the network I/F 212.

In the present embodiment, the device 200 may have a different configuration from the hardware configuration illustrated in FIG. 2. For example, the device 200 may have a configuration of performing a process according to a flowchart (which will be described later) in collaboration with a plurality of CPUs and a plurality of memories.

Figure 3:
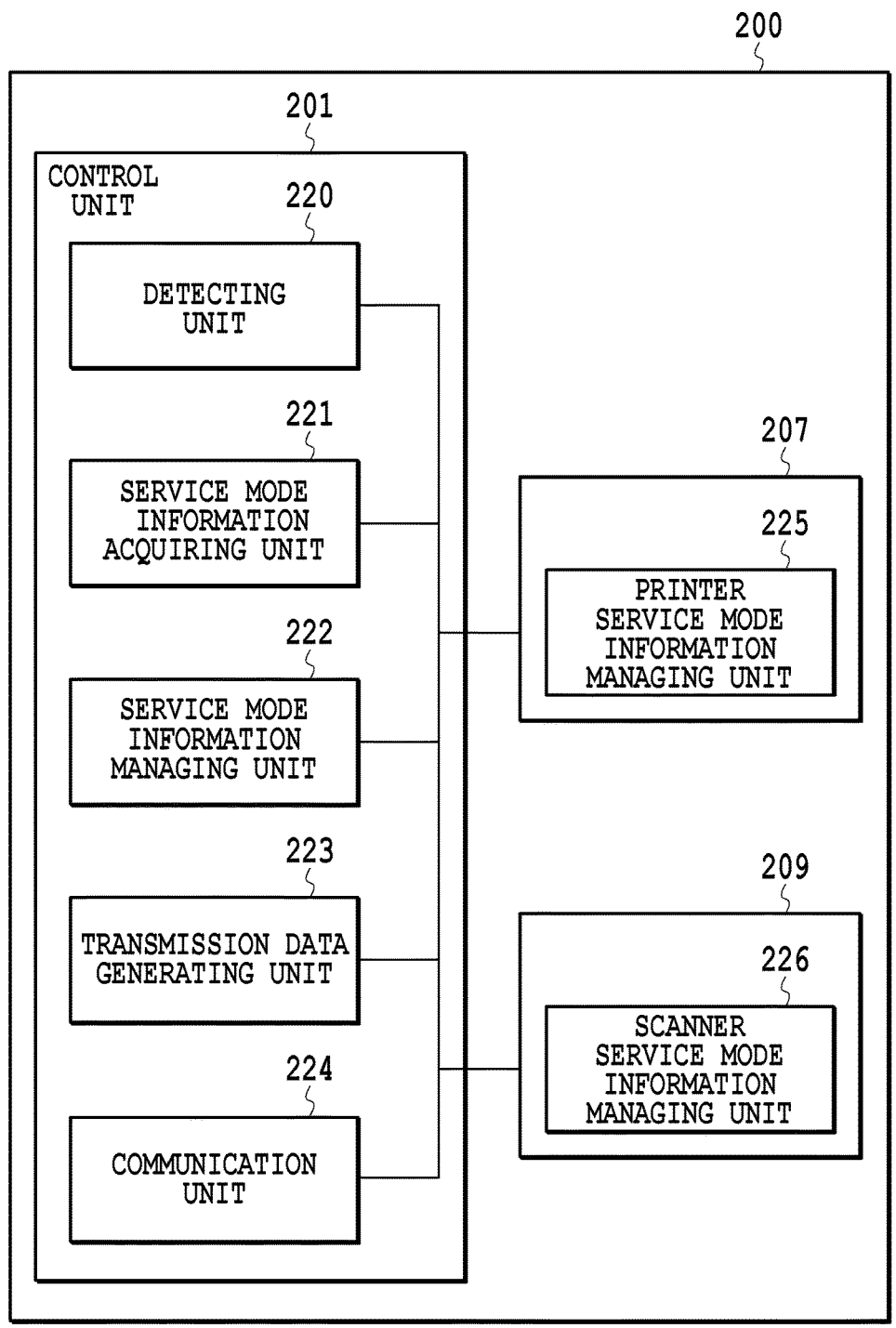
FIG. 3 is a block diagram illustrating a functional configuration of a device according to an embodiment.

FIG. 3 is a block diagram illustrating a functional configuration of the device 200.

A detecting unit 220 detects a state or a failure of the device 200. Here, the state of the device 200 refers to, for example, information indicating temperature or humidity of the device or information acquired from various kinds of sensors with which the device 200 is equipped. The state of the device 200 is mainly used in a case where the monitoring server 500 remotely monitors the device 200. The failure of the device refers to information indicating various kinds of troubles occurred in the device, and includes, for example, information indicating a failure of a part in the device or out-of-toner or out-of-ink.

A service mode information acquiring unit 221 acquires service mode information indicating a setting of the device 200 from a printer service mode information managing unit 225 and a scanner service mode information managing unit 226. Here, the setting of the device 200 refers to, for example, information that is referred to in a case where the device 200 performs image processing.

The setting of the device 200 is referred in a case where the printer 207 or the scanner 209 performs image processing, and adjusted by the service man. For the setting of the device 200, an input of various kinds of settings is received by the operation panel 211 of the device 200, or a change in various kinds of settings is received by the operation panel 211 and stored in the RAM 203 or the HDD 205. Alternatively, setting information is received via the network through the network I/F 212 and stored in the RAM 203 or the HDD 205.

In the present embodiment, in a case where the service mode information acquiring unit 221 accesses the printer service mode information managing unit 225 or the scanner service mode information managing unit 226, a communication rate is a very low rate. Thus, the more the number of items included in the service mode information, the service mode information acquiring unit 221 takes a long time to acquire the service mode information of the device 200. Accordingly, the service mode information acquiring unit 221 can acquire the items from the service mode information in the descending order of priorities, and thus a processing time can be reduced.

A service mode information managing unit 222 stores the service mode information acquired by the service mode information acquiring unit 221 in the RAM 203 or the HDD 205, and manages the service mode information. Specifically, the service mode information managing unit 222 manages the service mode information such that items of the service mode are stored in the RAM 203 or the HDD 205 in association with values corresponding to the respective items. The items of the service mode and the values corresponding to the respective items will be described in detail with reference to FIG. 4.

The printer service mode information managing unit 225 manages the service mode information of the printer 207 such that the items of the service mode are stored in the RAM 203 or the HDD 205 in association with the values corresponding to the respective items, similarly to the service mode information managing unit 222.

The scanner service mode information managing unit 226 manages the service mode information of the scanner 209 such that the items of the service mode are stored in the RAM 203 or the HDD 205 in association with the values corresponding to the respective items, similarly to the service mode information managing unit 222.

A transmission data generating unit 223 generates transmission data to be transmitted to the monitoring server 500 based on the service mode information managed by the service mode information managing unit 222. In the present embodiment, the transmission data generating unit 223 generates transmission data having a data structure which can be transmitted and received between the monitoring server 500 and the device 200. As an example of the data structure, a data structure that is described in an XML format (which will be described later) and conforms to a simple object access protocol (SOAP) is illustrated. An exemplary data structure will be described in detail with reference to FIG. 5.

A communication unit 224 controls communication performed through the network I/F 212, and undertakes functions of a transmitting unit and a receiving unit in the present invention. The communication unit 224 transmits the transmission data generated by the transmission data generating unit 223 to the monitoring server 500 and the like. Alternatively, the communication unit 224 receives the transmission data from the monitoring server 500 or the like.

FIG. 4 is a diagram illustrating exemplary service mode information according to the present embodiment.

The service mode information according to the present embodiment is stored in the RAM 203 or the HDD 205 such that the items of the service mode are associated with the values corresponding to the respective items through the service mode information managing unit 222.

A reference numeral 230 denotes exemplary service mode information. In the service mode information, items 231, 232, and 233 of the service mode information are associated with values 234. In the present embodiment, "TIER-1," "TIER-2," and "TIER-3" correspond to a major item 231, an medium item 232, and a minor item 233 of the service mode information, respectively. As illustrated in FIG. 4, "TIER-1," "TIER-2," and "TIER-3" have a hierarchical structure, and more specific information is associated with a lower-order item.

For example, referring to FIG. 4, "COPY" is recorded in "TIER-1" as information specifying a unit in the device 200. Next, "ADJUSTMENT" is recorded in "TIER-2" as information specifying a setting of "COPY." Next, as information specifying a setting of "ADJUSTMENT," "BRIGHTNESS" is recorded in "TIER-3" as information specifying brightness set to a copy unit (not illustrated), for example.

These items are stored in association with the values 234. In the present embodiment, "90" is associated as the values corresponding to the items "COPY," "ADJUSTMENT," and "BRIGHTNESS" as illustrated in FIG. 4. This indicates that a brightness setting of the copy unit (not illustrated) in the device 200 is 90.

The monitoring server 500 refers to the values 234 according to an item. Alternatively, in order to set the device 200, the values 234 are adjusted through the monitoring server 500 or the operation panel 211. Content of each item described with reference to FIG. 4 is merely an example, and embodiments are not limited to the above example.

FIG. 5 is a diagram illustrating exemplary transmission data according to the present embodiment.

As described above, the transmission data according to the present embodiment is generated in a data structure in which the transmission data can be transmitted and received between the monitoring server 500 and the device 200. As an example of the data structure, a data structure that is described in an XML format and conforms to the SOAP protocol (hereinafter, the data structure is referred to as "XML/SOAP data") is illustrated. In the XML/SOAP data of the present embodiment, a method of instructing a process to be performed by the monitoring server 500 may be included in the XML/SOAP data. Through this configuration, the XML/SOAP data can be transmitted and received via the network according to a predetermined communication scheme. Further, in the present embodiment, various kinds of methods included in the XML/SOAP data conform to a HTTP protocol.

XML/SOAP data 501 shows an exemplary description of the method getClock which instructs the monitoring server 500 to perform a process of acquiring time information. XML/SOAP data 502 shows an exemplary description of the method getClockResponse which notifies the device 200 of a result of the process of acquiring time information instructed by the method getClock. The method getClock is a kind of method of instructing the monitoring server 500 to perform a process of acquiring information indicating a state or a setting of the monitoring server 500.

XML/SOAP data 503 shows an exemplary description of the method postServiceMode which provides the monitoring server 500 with the service mode information. XML/SOAP data 504 shows an exemplary description of the method postServiceModeResponse which notifies the device 200 of a response to the method postServiceMode.

As described above, the present embodiment has been described in connection with the example in which the XML/SOAP data is applied. However, embodiments are not limited thereto, any other data structure other than the XML/SOAP data may be used as long as data conversion is possible in a data communication environment between different types of devices or in a data communication environment via the Internet 110.

Figure 6A:
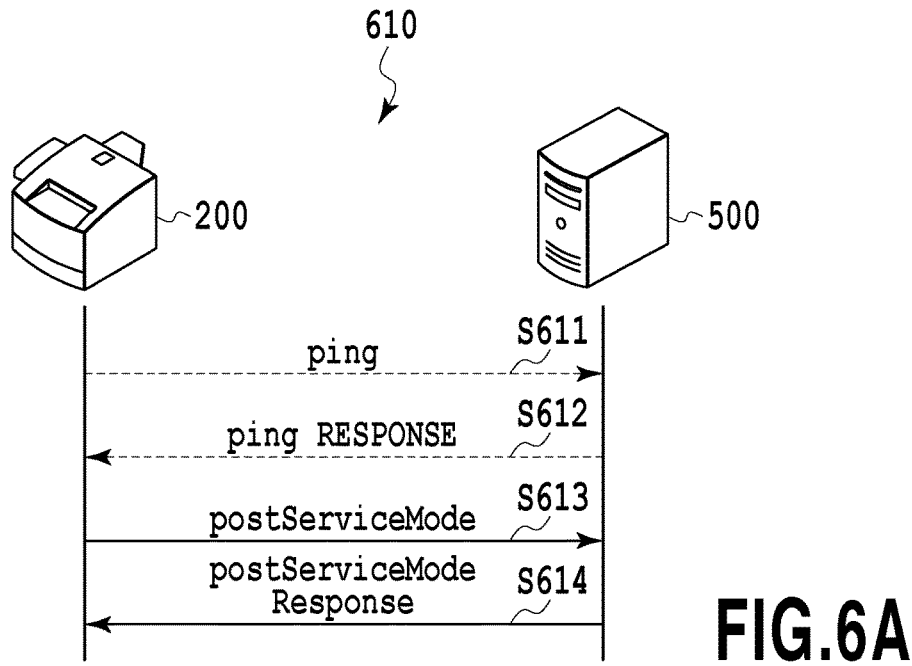
FIG. 6A is a diagram illustrating a communication sequence in a monitoring system according to a related art.
Figure 6B:
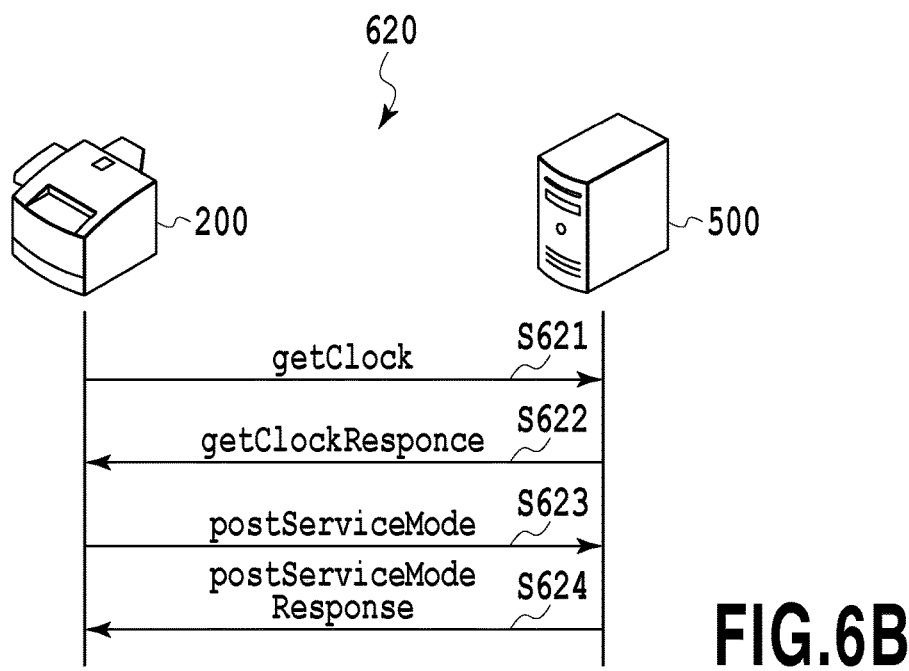
FIG. 6B is a diagram illustrating a communication sequence in a monitoring system according to an embodiment.

FIGS. 6A and 6B are diagrams illustrating exemplary communication sequences in monitoring systems. FIG. 6A is a diagram illustrating a communication sequence 610 in a monitoring system according to a related art, and FIG. 6B is a diagram illustrating a communication sequence 620 in the monitoring system according to the present embodiment.

In both of the monitoring systems of FIG. 6A and FIG. 6B, the device 200 transmits the service mode information to the monitoring server 500 at a predetermined timing.

At this time, in the monitoring system of the related art illustrated in FIG. 6A, before the method postServiceMode is transmitted, a ping packet is transmitted from the device 200 to the monitoring server 500 as a communication acknowledgement request (S611).

Upon receiving a ping response from the monitoring server 500 (S612), the device 200 recognizes that it is a state in which communication between the device 200 and the monitoring server 500 is possible. Thereafter, as the ping response is received, the device 200 transmits the method postServiceMode to the monitoring server 500 (S613).

However, in a case where the monitoring server 500 is the HTTP server or the like and does not support reception of the ping packet, it is difficult to perform the communication acknowledgement using the ping packet between the device 200 and the monitoring server 500. In this situation, the device 200 transmits the method postServiceMode to the monitoring server 500 without transmitting the ping packet to the monitoring server 500 (S613). Thus, in a case where a failure has occurred in the monitoring server 500 and the monitoring server 500 is not able to receive the method postServiceMode from the device 200, an unnecessary communication load is put on the network.

On the other hand, in the monitoring system of the present embodiment illustrated in FIG. 6B, before the method postServiceMode is transmitted, the method getClock is transmitted from the device 200 to the monitoring server 500 (S621). In a case where the monitoring server 500 receives the method getClock, the monitoring server 500 transmits getClockResponse described in the XML/SOAP data to the device 200 (S622).

In a case where the method getClockResponse is received, the device 200 determines that there is a response to the communication acknowledgement request, and recognizes that it is the state in which communication between the device 200 and the monitoring server 500 is possible. Thereafter, the device 200 transmits the method postServiceMode to the monitoring server 500 (S623).

Meanwhile, in a case where the device 200 has not received getClockResponse, the device 200 determines that there has been no response to the communication acknowledgement request, and recognizes that it is the state in which communication between the device 200 and the monitoring server 500 is disabled. Thereafter, the control unit 201 of the device 200 suppresses the service mode information acquiring unit 221 from acquiring the service mode information and suppresses the communication unit 224 from transmitting the service mode information to the monitoring server 500 (S623).

Then, in a case where the monitoring server 500 receives the method postServiceMode, the monitoring server 500 transmits postServiceModeResponse described in the XML/SOAP data to the device 200 (S624).

As described above with reference to FIG. 3, in the device 200 according to the present embodiment, the service mode information acquiring unit 221 acquires the service mode information from the sub-devices (for example, the printer 207 and the scanner 209) in the device 200. Then, the transmission data generating unit 223 generates the transmission data to be transmitted to the monitoring server 500 based on the acquired service mode information. Further, as described above with reference to FIG. 5 and FIGS. 6A and 6B, the transmission data generating unit 223 generates the XML/SOAP data including the method postServiceMode as the transmission data of the service mode information.

The transmission data generating unit 223 further generates the XML/SOAP data including the method getClock as the transmission data for the communication acknowledgement request. At this time, the control unit 201 generates the XML/SOAP data including the method getClock with a lower processing load than in a case where the XML/SOAP data including the method postServiceMode is generated. In other words, the control unit 201 can generate the transmission data for the communication acknowledgement request with a lower processing load than in a case where the transmission data of the service mode information is generated. Thus, the communication acknowledgement between the device 200 and the monitoring server 500 can be performed using the method getClock having a low processing load before the method postServiceMode for transmitting the service mode information is transmitted.

In the present embodiment, the transmission data for the communication acknowledgement request has been described in the form using the method getClock transmitted to request the time information, but embodiments are not limited thereto. Any other form may be employed as long as it is generated with a lower processing load than in a case where the XML/SOAP data including the method postServiceMode is generated, and the data structure is the same.

For the timing at which the device 200 transmits the communication acknowledgement request to the monitoring server 500 (S621), various forms may be employed. For example, the transmitting may be regularly performed based on a time that is set in advance or may be performed at a timing at which a service mode information transmission instruction is received by the operation panel 211.

Figure 7:
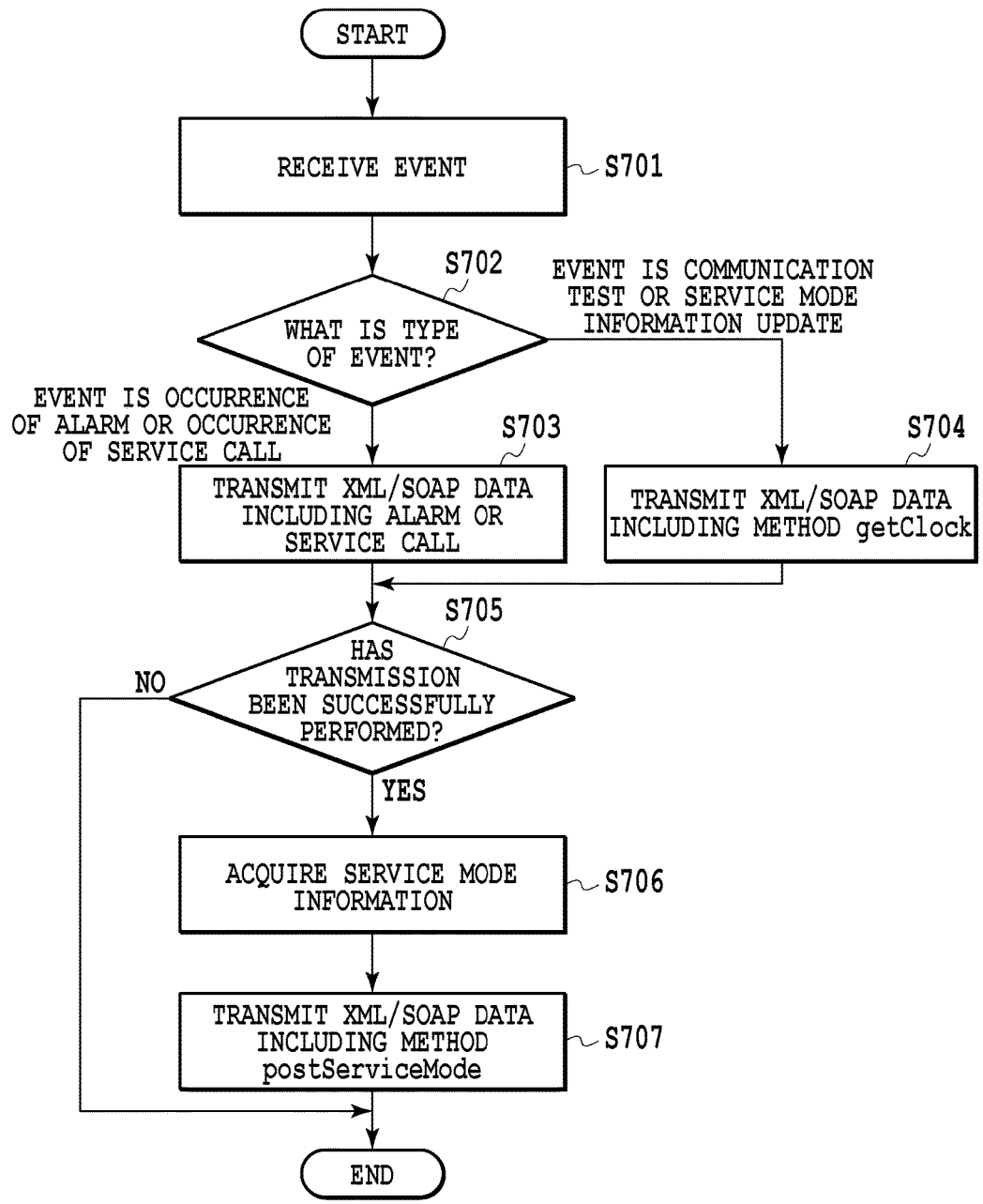
FIG. 7 is a flowchart illustrating a service mode information transmission process according to an embodiment.

FIG. 7 is a flowchart illustrating a service mode information transmission process according to the present embodiment. The service mode information transmission process according to the present embodiment will be described below with reference to FIG. 7.

In S701, the control unit 201 receives a trigger event for transmitting the service mode information.

In S702, the control unit 201 determines a type of the received event. In a case where the event is the occurrence of an alarm or the occurrence of a service call, the process proceeds to S703. Here, the alarm is, for example, information indicating failure of the device 200 detected by the detecting unit 220. The service call is, for example, information indicating the state of the device 200 detected by the detecting unit 220 in response to an input of a setting or a change to the operation panel 211 by the serviceman.

On the other hand, in a case where the event is determined to be a communication test or a service mode information update in S702, the process proceeds to S704. Here, the communication test refers to checking whether or not the state in which communication between the device 200 and the monitoring server 500 is possible in response to a request from the device 200, the monitoring server 500, or the like, for example. The service mode information update refers to updating the service mode information stored in the service mode information managing unit 222 and the monitoring server 500 to the latest one, for example.

In S703, the transmission data generating unit 223 generates XML/SOAP data including the alarm or service call information. Then, the communication unit 224 transmits the XML/SOAP data of the alarm or the service call to the monitoring server 500.

In S704, the transmission data generating unit 223 generates the XML/SOAP data including the method getClock.

Then, the communication unit 224 transmits the XML/SOAP data including the method getClock to the monitoring server 500.

In S705, the control unit 201 determines whether or not the XML/SOAP data generated in S703 or S704 has been successfully transmitted. In a case where the XML/SOAP data is determined to have been successfully transmitted (YES in S705), it is determined that the transmission data transmitted in S703 or S704 have arrived at the monitoring server 500, and there has been a response from the monitoring server, and the process proceeds to S706.

On the other hand, in a case where the transmission of the XML/SOAP data is determined to have failed (NO in S705), the control unit 201 determines that the transmitted transmission data has not arrived at the monitoring server 500 or there has been no response from the monitoring server. At this time, the control unit 201 suppresses the service mode information acquiring unit 221 and the communication unit 224 from performing the process of S706 and the process of S707, respectively.

In S706, the control unit 201 acquires the service mode information. As described above, in the present embodiment, the service mode information acquiring unit 221 acquires the service mode information indicating the setting of the device 200, for example, from the sub-device such as the printer or the scanner. Then, the transmission data generating unit 223 generates the transmission data to be transmitted to the monitoring server 500 based on the acquired service mode information.

In S707, the communication unit 224 transmits the service mode information to the monitoring server 500. In the present embodiment, the XML/SOAP data including the method postServiceMode generated by the transmission data generating unit 223 is transmitted to the monitoring server 500. In a case where the process of S707 ends, the present flowchart ends.

As described above, in the monitoring system according to the present embodiment, the communication acknowledgement request transmitted from the device 200 to the monitoring server 500 has the same data structure as the data structure for transmitting the service mode information. Thus, even in a case where the monitoring server 500 serving as the transmission destination from the device 200 is the HTTP server and does not support the reception of the ping packet, the communication acknowledgement between the device 200 and the monitoring server 500 can be reliably performed. Accordingly, the device 200 can suppress the unnecessary communication load from being put on the network while suppressing the wasteful process for acquiring the service mode information.

Second Embodiment

The first embodiment has been described in the form in which the device 200 directly transmits the service mode information to the monitoring server 500. In a monitoring system 800 according to the present embodiment, there are a plurality of devices 200 and 250 below a LAN 120, and the service mode information is first transmitted from each of the plurality of devices 200 and 250 to an in-LAN monitoring server 810. Then, the in-LAN monitoring server 810 collects the service mode information from the plurality of devices 200 and 250, and transmits the collected service mode information to the monitoring server 500 collectively.

The monitoring system 800 according to the present embodiment can be suitably used in a case where the plurality of devices 200 and 250 in the LAN 120 are collectively managed. In the present embodiment, the monitoring server 500 and the in-LAN monitoring server 810 support different methods in a case where performing communication with the device 200. For this reason, the device 200 has to generate XML/SOAP data including a different type of method according to a type of monitoring server. Hereinafter, in the description of the present embodiment, a duplicated description with the first embodiment is omitted, and the description will proceed with different points of both embodiments.

Figure 8:
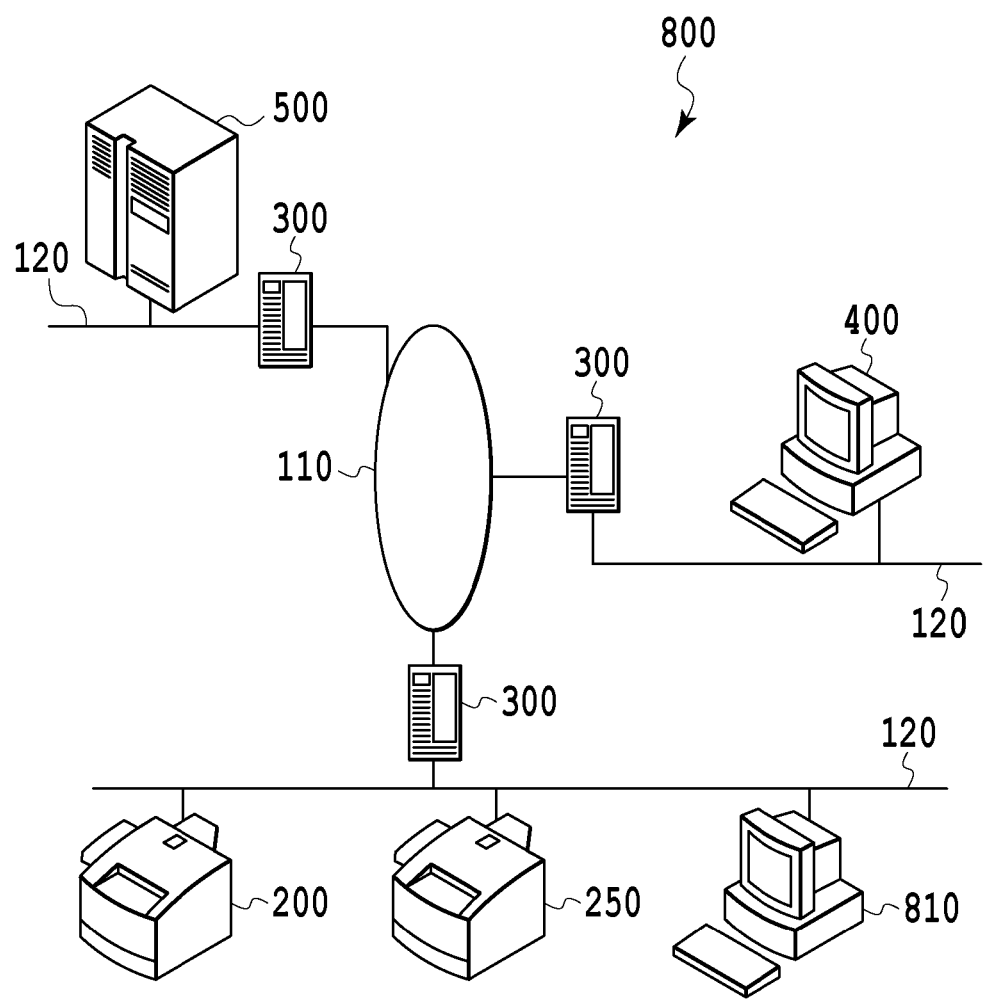
FIG. 8 is a diagram illustrating an overall configuration of a monitoring system according to a second embodiment.

FIG. 8 is a diagram illustrating an overall configuration of the monitoring system 800 according to the present embodiment.

Components having the same reference numerals as in the monitoring system 100 illustrated in FIG. 1 indicate the same components even in the monitoring system 800 of FIG. 8. In the monitoring system 800, reference numerals 200 and 250 are a plurality of devices 200 and 250 connected to the same LAN 120. These devices 200 and 250 are connected to be able to perform communication with the in-LAN monitoring server 810 via the LAN 120. The in-LAN monitoring server 810 receives the service mode information from the devices 200 and 250, collects the received service mode information, and then transmits the service mode information to the monitoring server 500.

FIG. 9 is a diagram illustrating exemplary transmission data according to the present embodiment.

The transmission data according to the present embodiment is generated to have a data structure in which the transmission data can be transmitted and received between the device 200 and the monitoring servers 500 and 810. As an example of the data structure, the XML/SOAP data is illustrated, similarly to the first embodiment.

XML/SOAP data 901 shows an exemplary description of the method checkHost which instructs the in-LAN monitoring server 810 to perform a process of acquiring URL information of the in-LAN monitoring server 810. XML/SOAP data 902 shows an exemplary description of the checkHostResponse which notifies the device 200 of a result of the process of acquiring URL information instructed by the method checkHost.

FIG. 10 is a diagram illustrating a communication sequence 1000 in the monitoring system 800 according to the present embodiment.

In the monitoring system 800 of FIG. 8, the device 200 transmits the service mode information to the in-LAN monitoring server 810 at a predetermined timing. In the monitoring system 800 of the present embodiment, before the method postServiceMode is transmitted, the method checkHost is transmitted from the device 200 to the in-LAN monitoring server 810 (S1001). In a case where the in-LAN monitoring server 810 receives the method checkHost, checkHostResponse described in the XML/SOAP data is transmitted from the in-LAN monitoring server 810 to the device 200 (S1002).

In a case where checkHostResponse is received, the device 200 determines that there is a response to the communication acknowledgement request, and recognizes that it is a state in which communication between the device 200 and the in-LAN monitoring server 810 is possible. Thereafter, the device 200 transmits the method postServiceMode to the in-LAN monitoring server 810 (S1003).

On the other hand, in a case where checkHostResponse has not been received, the device 200 determines that there has been no response to the communication acknowledgement request, and recognizes that it is a state in which communication between the device 200 and the in-LAN monitoring server 810 is disabled. Thereafter, the control unit 201 suppresses the service mode information acquiring unit 221 from acquiring the service mode information, and suppresses the communication unit 224 from transmitting the service mode information to the monitoring server 500 (S1003).

Then, in a case where the in-LAN monitoring server 810 receives the method postServiceMode, postServiceModeResponse of the XML/SOAP data is transmitted from the in-LAN monitoring server 810 to the device 200 (S1004).

Thereafter, the in-LAN monitoring server 810 transmits the method postServiceMode to the monitoring server 500 (S1005). Then, in a case where the monitoring server 500 receives the method postServiceMode, postServiceModeResponse of the XML/SOAP data is transmitted from the monitoring server 500 to the in-LAN monitoring server 810 (S1006).

Figure 11:
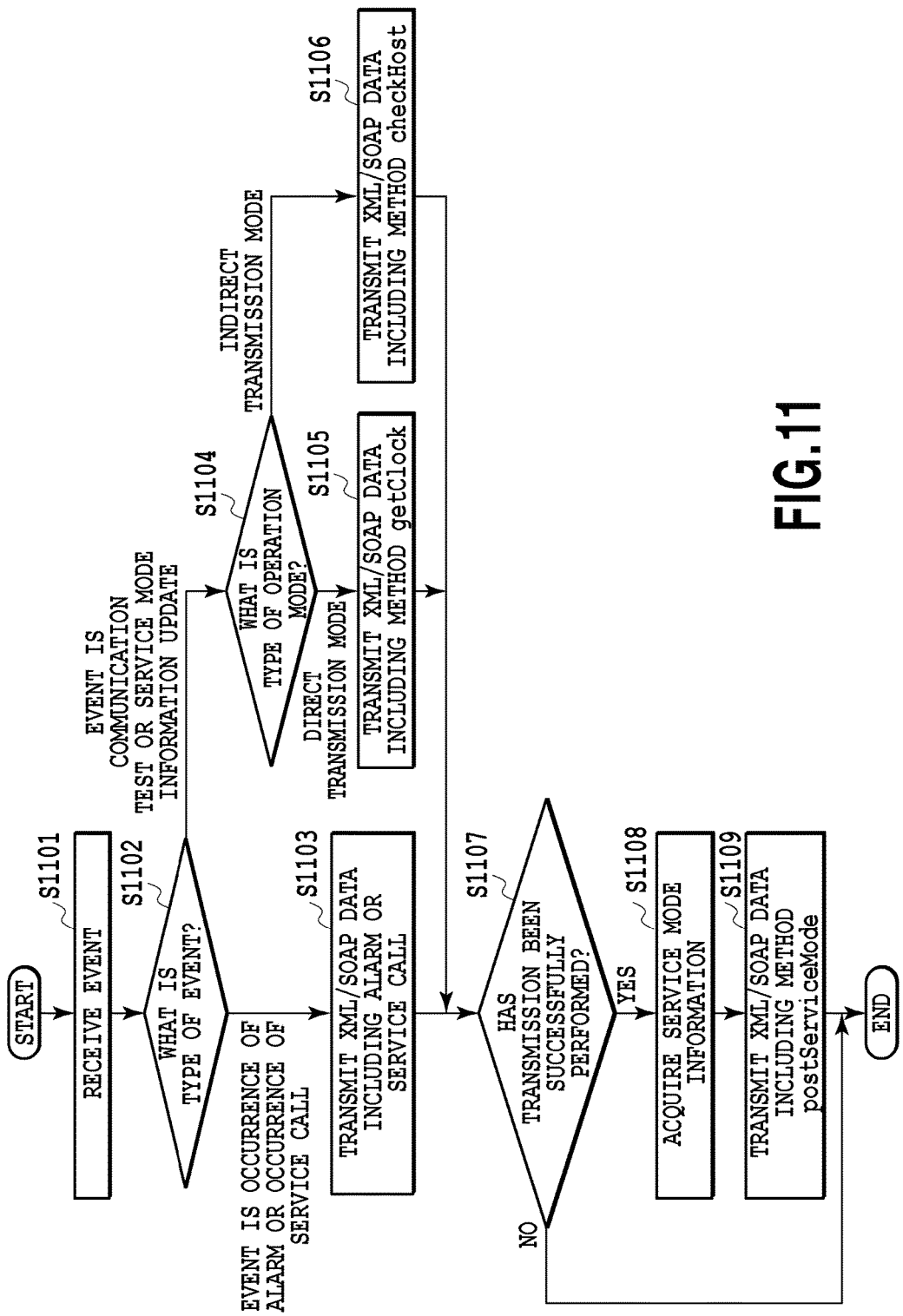
FIG. 11 is a flowchart illustrating a service mode information transmission process according to the second embodiment.

FIG. 11 is a flowchart illustrating a service mode information transmission process according to the present embodiment. The service mode information transmission process according to the present embodiment will be described below with reference to FIG. 11.

The process of S1101 to S1103 is the same as the process of S701 to 703 of FIG. 7 in the first embodiment.

In S1104, the control unit 201 determines an operation mode. In the present embodiment, the operation mode refers to information specified based on a type of monitoring server. In the present embodiment, the device 200 is set to any one of a direct transmission mode in which the device 200 directly transmits the service mode information to the monitoring server 500 and an indirect transmission mode in which the device 200 first transmits the service mode information to the in-LAN monitoring server 810.

In a case where the operation mode of the device 200 is the direct transmission mode, the process proceeds to S1105, and the transmission data generating unit 223 generates the XML/SOAP data including the method getClock. Then, the communication unit 224 transmits the XML/SOAP data including the method getClock to the monitoring server 500.

On the other hand, in a case where the operation mode of the device 200 is the indirect transmission mode, the process proceeds to S1106, and the transmission data generating unit 223 generates XML/SOAP data including the method checkHost. Then, the communication unit 224 transmits the XML/SOAP data including the method checkHost to the monitoring server 500.

In the present embodiment, the control unit 201 performs a function of a decision unit in the present invention by performing the process of S1104 to S1106.

Thereafter, the process of S1107 to S1109 is the same as the process of S705 to S707 of FIG. 7 in the first embodiment.

As described above, in the monitoring system 800 according to the present embodiment, in addition of the function of the first embodiment, the device 200 generates XML/SOAP data including a different type of method according to a type of monitoring server. Through this configuration, even in the network configuration in which a plurality of monitoring servers are arranged in the monitoring system, the device can transmit the communication acknowledgement request to the monitoring servers that support different methods. Thus, the flexible operation in which the service mode information from each of a plurality of devices is first collected in the managing server in the LAN, and the collected service mode information is collectively transmitted to the monitoring server outside the LAN can be provided.

Third Embodiment

The monitoring system according to the present embodiment will be described. According to the present embodiment, the device 200 performs to retry transmitting the transmission data to the monitoring server 500 in a case where the device 200 fails to transmit the communication acknowledgement request or the service mode information. Hereinafter, in the description of the present embodiment, a duplicated description with the first or second embodiment is omitted, and the description will proceed with different points of both embodiments.

Figure 12C:
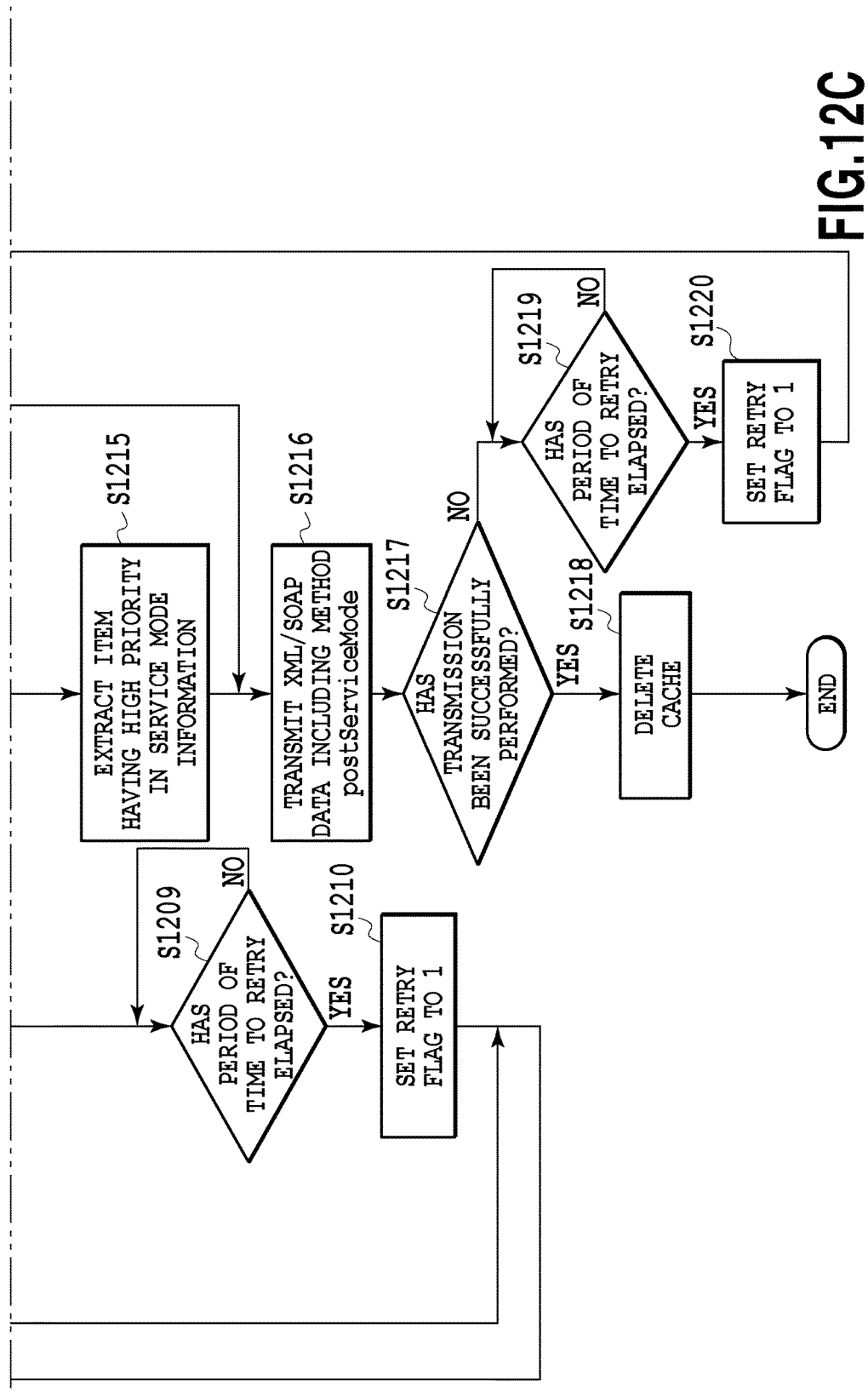

FIG. 12 is a diagram showing the relationship of FIGS. 12A, 12B and 12C. FIGS. 12A, 12B and 12C are flowcharts illustrating a service mode information transmission process according to the present embodiment. The service mode information transmission process according to the present embodiment will be described below with reference to FIGS. 12A to 12C.

The process of S1201 to S1205 is the same as the process of S701 to 705 of FIG. 7 in the first embodiment.

In S1206, the control unit 201 determines a type of the received event. In a case where the event is the occurrence of an alarm or the occurrence of a service call, the process proceeds to S1207.

In S1207, the control unit 201 acquires the service mode information. As described above, in the present embodiment, the service mode information acquiring unit 221 acquires the service mode information indicating the setting of the device 200, for example, from the printer 207 or the scanner 209 serving as the sub-device.

In S1208, the control unit 201 caches temporarily the service mode information acquired by the service mode information acquiring unit 221 in a cache area of the CPU 202 or the RAM 203. In the present embodiment, in a case where the event is the occurrence of the alarm or the occurrence of the service call, the service mode information at the time of the occurrence of the event is transmitted to the monitoring server 500, and thus the monitoring server 500 can analyze the service mode information at the time of the occurrence of the event.

In S1209, the control unit 201 determines whether or not a period of time until to the retry has elapsed, and in a case where the period of time to the retry is determined to have elapsed (YES in S1209), in S1210, the control unit 201 sets a "retry flag" to 1. The retry flag is used for determining whether or not transmission of the service mode information has been performed by the retry in S1214 which will be described later. In a case where the process of S1210 ends, the process proceeds to S1202 again.

On the other hand, in a case where the event is determined to be the communication test or the service mode information update in S1206, the process of S1207 to S1210 is skipped, and the process proceeds to S1202 again. In the present embodiment, in a case where the event is the communication test or the service mode information update, since the device 200 has to transmit the latest service mode information, the control unit 201 does not perform the caching process of S1208.

In a case where the transmission of the XML/SOAP data is determined to have been successfully performed in S1205 (Yes in S1205), in S1211, the control unit 201 further determines whether or not a cache is stored in the cache area of the CPU 202 or the RAM 203. In a case where it is determined that there is a cache (YES in S1211), the control unit 201 acquires the service mode information cached in the cache area of the CPU 202 or the RAM 203 (S1213). On the other hand, in a case where it is determined that there is no cache (NO in S1211), the control unit 201 acquires the service mode information (S1212).

In S1214, the control unit 201 determines whether or not current transmission of the service mode information is the retry. Specifically, it is determined whether or not the retry flag has been set to "1" in S1210, and in a case where the retry flag has been set to "1," the current transmission of the service mode information is determined to be the retry.

In a case where the current transmission of the service mode information is determined to be the retry (YES in S1214), the control unit 201 extracts an item having a high priority in the service mode information acquired in S1212 or S1213 (S1215). In a case where the retry is determined to have been performed, since the communication state between the device 200 and the monitoring server 500 is likely to be unstable, the control unit 201 transmits the items to the monitoring server 500 starting from the item having the high priority in the service mode information.

In the present embodiment, through the above configuration, it is possible to reduce the processing load for generating the transmission data through the device 200 and the network load for transmitting the transmission data from the device 200 to the monitoring server 500, and it is possible to increase the possibility that the transmission data will be successfully transmitted. Thereafter, in a case where the transmission of the transmission data for the item having the high priority in the service mode information has been successfully performed, the control unit 201 may continuously perform divisional transmission in which items having a low priority are transmitted in a stepwise manner.

In S1216, the transmission data generating unit 223 generates the transmission data to be transmitted to the monitoring server 500 based on the acquired service mode information. Then, the communication unit 224 transmits the service mode information to the monitoring server 500. In the present embodiment, the communication unit 224 transmits the XML/SOAP data including the method postServiceMode generated by the transmission data generating unit 223 to the monitoring server 500.

In S1217, the control unit 201 determines whether or not the transmission of the XML/SOAP data has been successfully performed. In a case where the transmission of the XML/SOAP data has been successfully performed (YES in S1217), it is determined that the transmission data transmitted in S1216 has arrived at the monitoring server 500, and there is a response from the monitoring server, the process proceeds to S1218.

On the other hand, in a case where the transmission of the XML/SOAP data is determined to have failed (NO in S1217), it is determined that the transmission data transmitted in S1216 has not arrived at the monitoring server 500, and there has been no response from the monitoring server, the process proceeds to S1219.

In S1218, the control unit 201 deletes the cache related to the service mode information stored in the cache area of the CPU 202 or the RAM 203, and ends the present flowchart.

On the other hand, in a case where the transmission of the XML/SOAP data is determined to have failed (NO in S1217), in S1219, the control unit 201 determines whether or not the period of time to the retry has elapsed. In a case where the period of time to the retry is determined to have elapsed (YES in S1219), in S1220, the control unit 201 sets the "retry flag" to "1". In a case where the process of S1210 ends, the process proceeds to S1204 again.

In the present embodiment, in a case where the transmission of the service mode information to the monitoring server has failed (NO in S1217), the communication unit 224 200 transmits the XML/SOAP data including the method getClock to the monitoring server 500 (S1204). In a case where the transmission of the service mode information is determined to have failed (NO in S1217), the processing load of the device 200 is likely to be very large, or the communication state between the device 200 and the monitoring server 500 is likely to be unstable. Thus, the control unit 201 reduces the processing load on the device 200 or the network load for transmitting the communication acknowledgement request by generating the transmission data for the communication acknowledgement request with the lower processing load than in a case where generating the transmission data of the service mode information.

As described above, in the monitoring system according to the present embodiment, in addition to the function of the first embodiment, in a case where the transmission of the communication acknowledgement request or the service mode information has failed, the device 200 retries the transmission of the transmission data to the monitoring server 500. Further, in a case where the cache related to the service mode information is stored, the device 200 transmits the transmission data to the monitoring server 500 based on the stored cache. Moreover, the device 200 retransmits the communication acknowledgement request having the same data structure as the data structure for transmitting the service mode information to the monitoring server 500 at the time of retry.

As the monitoring system according to the present embodiment is configured as described above, the device 200 can suppress the wasteful process for acquiring the service mode information and prevent the unnecessary communication load from being put on the network.

Application Example

In the first embodiment, in S702, S703, and S707 of FIG. 7, transmission of the XML/SOAP data including "getClock" intended for the communication acknowledgement by the communication unit 224 is omitted, and the transmission of the service mode information is performed. Similarly, in the second embodiment, in S1102, S1103, and S1109 of FIG. 11, transmission of the XML/SOAP data including "getClock" intended for the communication acknowledgement by the communication unit 224 is omitted, and the transmission of the service mode information is performed. It is because the notification of the service call or the like is transmitted through the XML/SOAP data, similarly to the transmission of the service mode information, and thus transmission success thereof is regarded as the same meaning as the success of the communication acknowledgement.

Here, there may be cases in which the notification of the service call or the like is not regarded as the same meaning as the communication acknowledgement, for example, the notification such as the service call may be transmitted by a transmission method other than the XML/SOAP data. Alternatively, in addition to the notification of the service call or the like, any other communication other than the XML/SOAP data including "getClock" may be further performed as the same meaning as the success of the communication acknowledgement.

In the present application example, in addition to the above embodiments, even in a case where transmission at the time of the occurrence of an event in which the transmission of the service mode information is necessary has been successfully performed, content of the transmission may be further identified, and then transmission control using the XML/SOAP data including "getClock" may be performed. In this case, a method other than "getClock" may be used as a method that is additionally performed. Thus, in the present application example, control is performed such that acquisition and transmission of the service mode information are performed only in a case where the transmission is further successfully performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. The present invention was made in light of the above problems. In other words, it is desirable to provide a network device capable of reliably performing the communication acknowledgement with the monitoring server even in a case where the monitoring server is the HTTP server or the like and does not support reception of the ping packet. A network device according to the present invention can reliably perform the communication acknowledgement with a monitoring server, and thus necessary information can be transmitted to the monitoring server without putting a wasteful processing load on the network device or putting an unnecessary communication load on the network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-232797, filed Nov. 17, 2014, which is hereby incorporated by reference wherein in its entirety.

What is claimed is:

1. A network device configured to generate first transmission data including setting information of the network device and transmit the generated first transmission data to a monitoring server via a network in response to an occurrence of a predetermined event, the network device comprising:
   a memory configured to store instructions; and
   a processor configured to execute the instructions stored in the memory to:
      detect the occurrence of the predetermined event;
      generate second transmission data associated with a command for executing a process different from a communication acknowledgement process before transmission of the first transmission data to the monitoring server in response to detecting the occurrence of the predetermined event, the second transmission data being generated in the same data structure as the first transmission data with a lower processing load than the first transmission data;
      transmit the generated second transmission data to the monitoring server using the command for executing the process different from the communication acknowledgement process, before transmission of the first transmission data; and
      suppress transmission of the first transmission data to the monitoring server in a case where a predetermined response to the transmission of the second transmission data using the command for executing the process different from the communication acknowledgement process is not received from the monitoring server.

2. The network device according to claim 1, wherein the first transmission data including the setting information of the network device is generated in response to receiving the predetermined response to the transmitted second transmission data from the monitoring server, and
   the generated first transmission data is transmitted to the monitoring server.

3. The network device according to claim 2, wherein the processor is configured to execute further instructions to:
   acquire setting information of a sub-device of the network device from the sub-device,
   wherein the first transmission data including the setting information which is to be transmitted to the monitoring server is generated based on the acquired setting information of the sub-device.

4. The network device according to claim 2, wherein the processor is configured to execute further instructions to:
   perform retry transmission in a case where a predetermined response to transmission of the first transmission data from the monitoring server is not received.

5. The network device according to claim 4, wherein an item having a high priority in the setting information is extracted, and the retry transmission is performed starting from the transmission data corresponding to the extracted item having the high priority.

6. The network device according to claim 4, wherein the second transmission data is generated before performing the retry transmission.

7. The network device according to claim 1, wherein the generation of the first transmission data including the setting information of the network device is suppressed in a case where the predetermined response to the transmitted second transmission data from the monitoring server is not received.

8. The network device according to claim 1, wherein the processor is configured to execute further instructions to:
   determine a type of the event, wherein the second transmission data is generated in a case where the event is a communication test or an update of the setting information, and third transmission data is generated in a case where the event is an occurrence of an alarm or an occurrence of a service call, the second transmission data being generated in the same data structure as the first transmission data including the setting information with a lower processing load than the first transmission data including the setting information of the network device, the third transmission data being generated in the same data structure as the first transmission data with a lower processing load than the first transmission data and used for notifying of the occurrence of the alarm or the occurrence of the service call, the generated second transmission data is transmitted to the monitoring server using a command for executing a process different from the communication acknowledgement process in a case where the event is the communication test or the update of the setting information, and the generated third transmission data is transmitted to the monitoring server using a command for notifying of the occurrence of the alarm or the occurrence of the service call in a case where the event is the occurrence of the alarm or the occurrence of the service call, and the transmission of the first transmission data is suppressed in a case where the predetermined response to transmission of the second transmission data from the monitoring server is not received or in a case where the predetermined response to transmission of the third transmission data from the monitoring server is not received.

9. The network device according to claim 8, wherein the second transmission data is not transmitted to the monitoring server before the first transmission data is transmitted to the monitoring server in a case where the event is the occurrence of the alarm or the occurrence of the service call.

10. The network device according to claim 1, wherein the first transmission data and the second transmission data have a data structure that is described in an XML format and conforms to a SOAP protocol.

11. The network device according to claim 10, wherein the first transmission data and the second transmission data includes a method conforming to a HTTP, and the method is the method for instructing the monitoring server to perform an acquisition time information.

12. The network device according to claim 1, wherein the processor is configured to execute further instructions to:

select the monitoring server serving as a transmission destination of the first transmission data from among a plurality of monitoring servers, wherein the second transmission data is generated corresponding to the selected monitoring server, and the generated second transmission data is transmitted to the corresponding monitoring server.

13. A control method of controlling a network device configured to generate first transmission data including setting information of the network device and transmit the generated first transmission data to a monitoring server via a network in response to an occurrence of a predetermined event, the control method comprising:

detecting the occurrence of the predetermined event;

generating second transmission data associated with a command for executing a process different from a communication acknowledgement process before transmission of the first transmission data to the monitoring server in response to detecting the occurrence of the predetermined event, the second transmission data being generated in the same data structure as the first transmission data with a lower processing load than the first transmission data;

transmitting the generated second transmission data to the monitoring server using the command for executing the process different from the communication acknowledgement process, before transmitting the first transmission data; and suppressing transmission of the first transmission data to the monitoring server in a case where a predetermined response to the transmission of the second transmission data using the command for executing the process different from the communication acknowledgement process is not received from the monitoring server.

14. A non-transitory computer readable storage medium storing a program for causing a computer to function as a network device, where the network device comprises:

a detecting unit configured to detect the occurrence of the predetermined event;

a transmission data generating unit configured to generate second transmission data associated with a command for executing a process different from a communication acknowledgement process before transmission of the first transmission data to the monitoring server in response to detecting the occurrence of the predetermined event, the second transmission data being generated in the same data structure as the first transmission data with a lower processing load than the first transmission data;

a transmitting unit configured to transmit the generated second transmission data to the monitoring server using the command for executing the process different from the communication acknowledgement process, before transmission of the first transmission data; and a control unit configured to suppress the transmitting unit from transmitting the first transmission data to the monitoring server in a case where a predetermined response to the transmission of the second transmission data using the command for executing the process different from the communication acknowledgement process is not received from the monitoring server.

* * * * *